United States Patent [19]

Lee

[11] Patent Number: 5,493,460
[45] Date of Patent: Feb. 20, 1996

[54] DRIVING DEVICE FOR A TAPE HOLDER OF A TAPE RECORDING/REPRODUCTION DEVICE

[75] Inventor: Jae S. Lee, Seoul, Rep. of Korea

[73] Assignee: Samsung Electronics Co., Ltd., Kyungki, Rep. of Korea

[21] Appl. No.: 283,802

[22] Filed: Aug. 1, 1994

Related U.S. Application Data

[63] Continuation of Ser. No. 11,538, Feb. 1, 1993, abandoned.

[30] Foreign Application Priority Data

Feb. 1, 1992 [KR] Rep. of Korea ............... 921679 U

[51] Int. Cl.$^6$ ............... G11B 15/675; G11B 5/008
[52] U.S. Cl. ............... 360/96.5; 360/99.06
[58] Field of Search ............... 360/96.1, 96.5, 360/93, 99.02, 99.06, 99.03, 99.07; 242/197, 198, 199, 200

[56] References Cited

U.S. PATENT DOCUMENTS 4,866,551  4/1989  Kishimoto et al. ............... 360/96.5

FOREIGN PATENT DOCUMENTS

| 0349329 | 1/1990 | European Pat. Off. | 360/96.5 |
| 55-125570 | 9/1980 | Japan | 360/96.5 |
| 59-139165 | 8/1984 | Japan | 360/96.5 |
| 63-50967 | 3/1988 | Japan | 360/96.5 |
| 63-179454 | 7/1988 | Japan | 360/96.5 |
| 0264957 | 8/1988 | Japan | 360/96.5 |
| 63-193369 | 8/1988 | Japan | 360/96.5 |
| 0130053 | 1/1989 | Japan | 360/96.5 |
| 02162559 | 6/1990 | Japan | 360/96.5 |

*Primary Examiner*—Stuart S. Levy
*Assistant Examiner*—William J. Klimowicz
*Attorney, Agent, or Firm*—Sughrue, Mion, Zinn, Macpeak & Seas

[57] ABSTRACT

A driving device for loading or ejecting a cassette tape in or from a deck of a tape recording/reproduction device. A horizontally movable device is engaged with a rotating side arm which pivots along with movement of a cassette holder. The movable device is disposed in the housing. Also, a member for opening or closing a light transfer path of a sensor is coupled to the horizontally movable member, thereby controlling driving of a loading motor effectively in response to a position of the movable member. The cassette holder can be smoothly mounted or ejected at a high speed even if the tape cassette is deeply inserted into the holder by the operator.

2 Claims, 3 Drawing Sheets

5,493,460

DRIVING DEVICE FOR A TAPE HOLDER OF A TAPE RECORDING/REPRODUCTION DEVICE

This is a Continuation of application Ser. No. 08/011,538 filed Feb. 1, 1993 now abandoned.

BACKGROUND OF THE INVENTION

1. Field of the Invention

The present invention relates to a driving device which can drive a cassette tape holder arranged in the housing of a tape recording/reproduction device. In particular, the present invention is a driving device which smoothly drives the cassette holder and controls the state of a sensor for controlling a loading motor in the process of loading or ejecting a cassette tape in or from a tape deck portion of the recording/ reproduction device.

2. Description of the Related Art

A known driving device for a cassette holder of a tape recorder housing includes a housing motor for loading or ejecting a cassette tape in or from a deck and a loading motor for loading or unloading a magnetic tape, contained in the cassette, to a head drum.

In a driving device of this type, when the cassette is inserted in a cassette holder, the insertion of the cassette is detected by a control device and the housing motor is then driven, under control of the control device, so that the cassette holder is moved and positioned on the deck in the housing by means of various driving members. Subsequently, the tape contained in the cassette is loaded on the drum, so that a recorded signal is reproduced or a new signal is recorded on the tape.

In the conventional driving device described above, however, various driving members arranged in the housing are needed to drive the cassette holder. Further, when the cassette tape is inserted into a cassette insertion position by force, gears arranged at a side of the housing, for driving the cassette holder, may be easily damaged. Also, since the tape is loaded through the various driving members, the housing must be large and loading time is relatively large.

SUMMARY OF THE INVENTION

An object of the present invention is to provide a driving device for a tape recording/reproduction device in which a plurality of movable members having a rack gear are arranged in the housing to rapidly drive a cassette holder and simultaneously control the state of a sensor for driving a loading motor.

Another object of the present invention is to provide a driving device for a tape recording/ reproduction device in which, even if a cassette tape is abruptly inserted into a cassette holder, the holder is driven in a stable manner.

In order to achieve the above objects, according to a preferred embodiment of the present invention, there is provided a driving device for a cassette holder of a recording/reproduction device arranged on a side surface of a chassis, for loading or ejecting a cassette tape inserted into the cassette holder in or from a deck of a recording/ reproduction device. The driving device has horizontally movable members which are engaged with a connection gear. The connection gear is rotated by a side arm which is engaged with the cassette holder having the cassette tape inserted therein. The movable members are disposed in the housing of the recording/reproduction device. Also, a device for opening or closing a light transfer path of a photoelectric sensor is provided on the movable members for controlling driving of a loading motor effectively.

BRIEF DESCRIPTION OF THE DRAWINGS

The above and other objects and advantages of the invention will be apparent from the following description taken with reference to the accompanying drawings in which.

DETAILED DESCRIPTION OF THE PREFERRED EMBODIMENT

Figure 1:
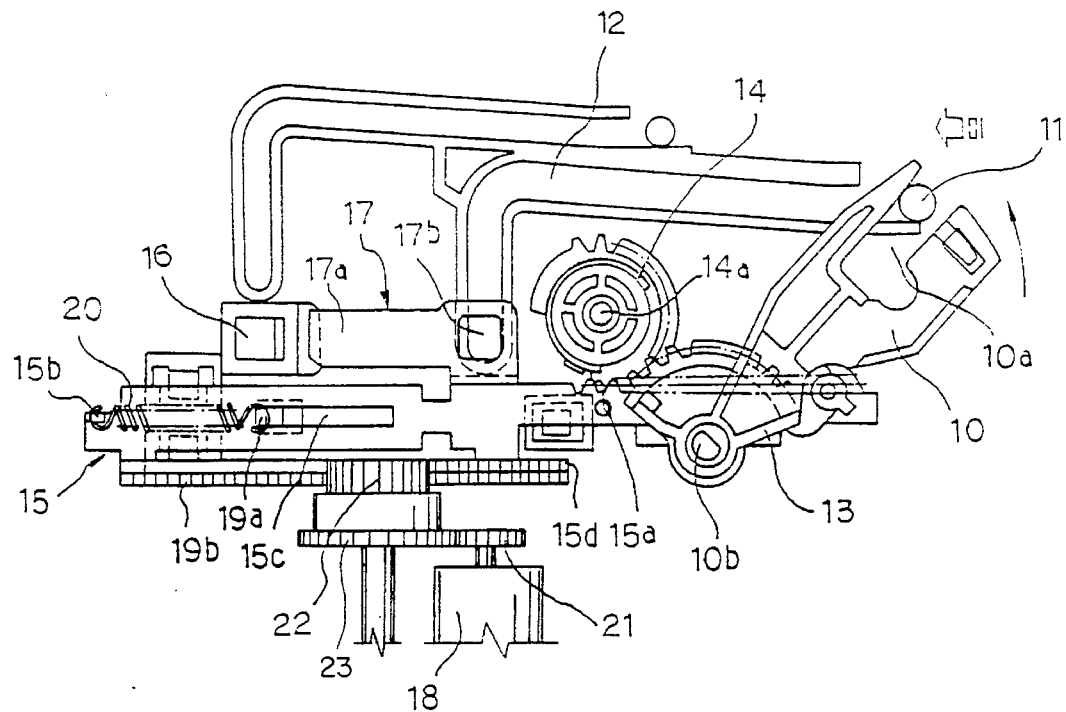
FIGS. 1–4 are side views illustrating a driving device according to a preferred embodiment of the present invention in various states of operation; and, FIGS. 5 and 6 illustrate first and second movable members employed in the driving device of the preferred embodiment.

FIGS. 1–6 illustrate a preferred embodiment of the driving device for a tape recording/reproduction device. A side arm 10 is pivotally mounted on shaft 10b at a side surface of a housing (not shown), a joining pin 11, connected with a cassette holder (not shown) for carrying a cassette tape, is inserted into a cutout portion 10a defined in the side arm 10 so that the pin 11 is engaged with the side arm 10 as it moves along a guide channel 12. And, at the opposite end of the side arm 10, an arm gear 13, having a fan shape, is mounted on the shaft 10b. The arm gear 13 is rotated when the side arm 10 is pivoted.

A connection gear 14, rotationally mounted on a shaft 14a, is engaged with an upper side of the arm gear 13. The connection gear 14 is also engaged with a rack gear 15a formed on a top surface of a first movable member 15.

One end of the rack gear 15a has a projection 15b formed thereon and an elongated hole 15c formed therein. A gear portion 15d is disposed on a lower side of the rack gear 15a. The gear portion 15d has teeth formed, so as to extend in a direction which is perpendicular to the teeth of the rack gear 15a, over a predetermined region X of the surface thereof (see FIG. 5).

A sensor control member 17, having a blocking plate 17a and a perforated hole 17b formed therein, is integrally formed at a central portion of an upper side of the first movable member 15 to control the state of a photoelectric sensor 16 located at a side surface of the housing. The sensor control member 17 selectively blocks a light path of the sensor 16 so as to allow a controller (not shown) to control a loading motor 18 in accordance with the output signal of the sensor 16. The controller can be a microprocessor based device, or the like. Also, the tape of the cassette will be loaded to a position proximate the sensor 16 for reasons which will become apparent below.

Figure 6:
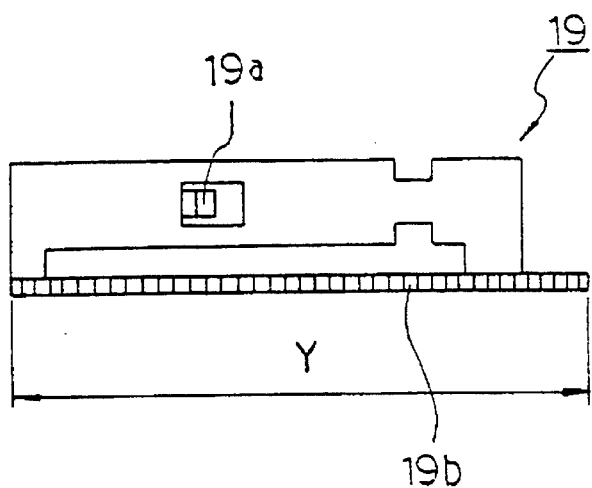

A second movable member 19 is disposed between the housing and the first movable member 15 (see FIGS. 1 and 6). The second movable member 19 has a projection 19a which is inserted in the elongated hole 15c of the first movable member 15. Further, the projection 19a is connected with the projection 15b of the first movable member 15 by means of a tension spring 20. Accordingly, the second movable member 19 is slidable with respect to the first movable member 15 while being guided by the elongated hole 15c and biased by the spring 20 which is under tension.

A gear portion 19b is provided at a lower end of the second movable member 19. Teeth formed over the entire region Y of the gear portion 19b, conform to the gear portion 15d of the first movable member 15 (see FIG. 6).

The gear portions 15d and 19b, of the first and second movable members 15 and 19 respectively, are engagable with a driving gear 22 which is attached to a gear 23 which is rotated by a pinion of a loading motor 18 so that the first and second driving gears 15 and 19 are separately or simultaneously moved in a horizontal direction as will be described below.

Figure 2:
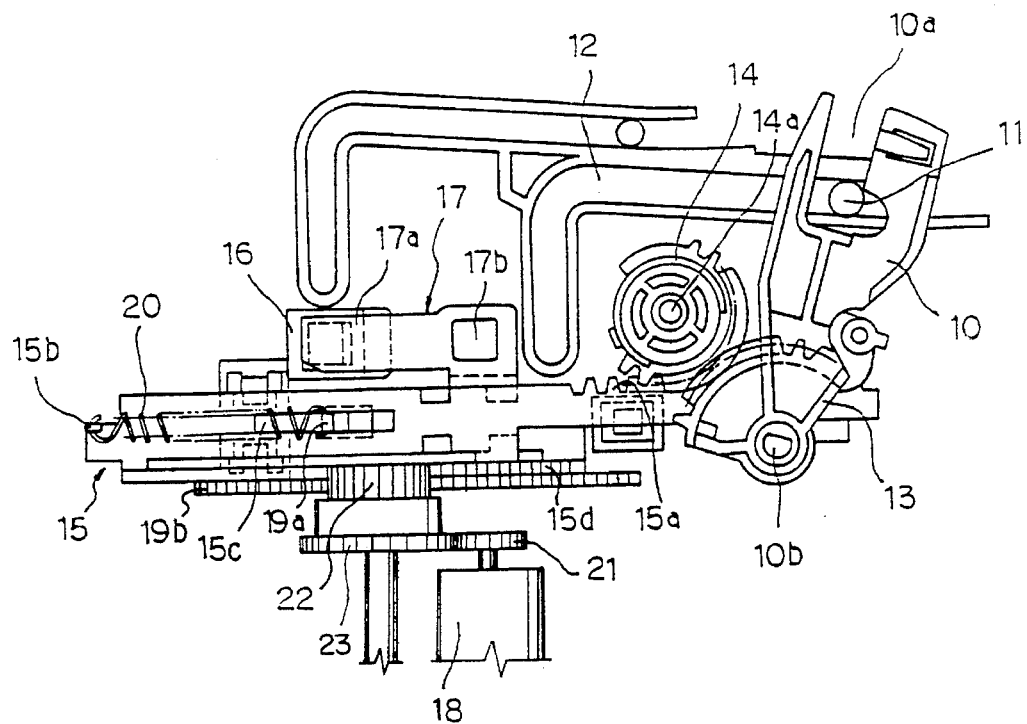
Figure 3:
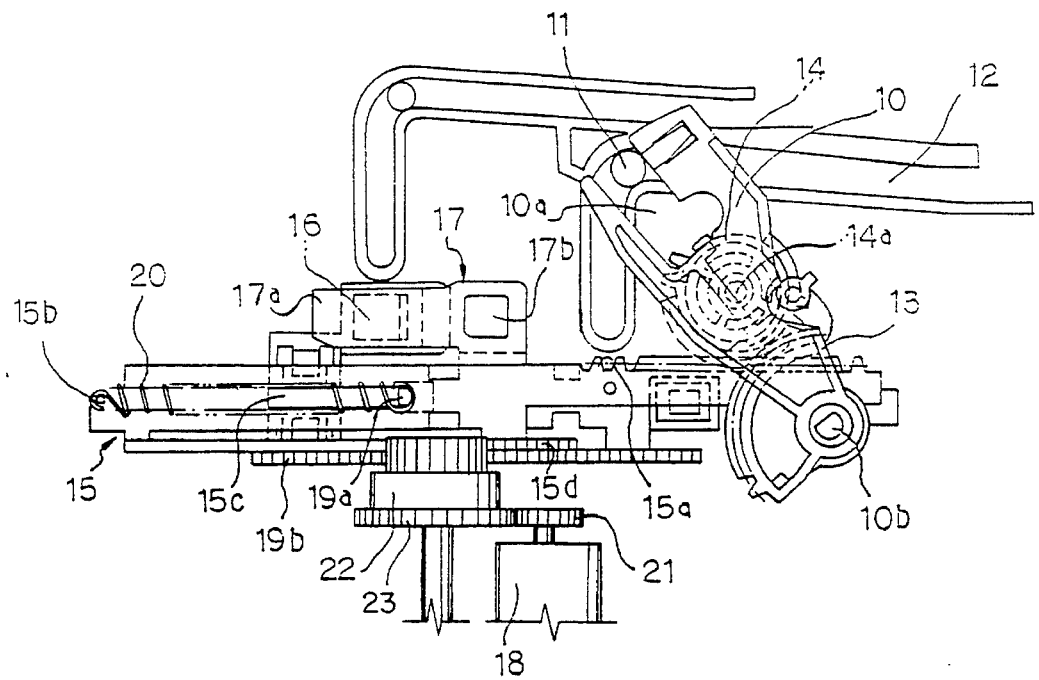
Figure 4:
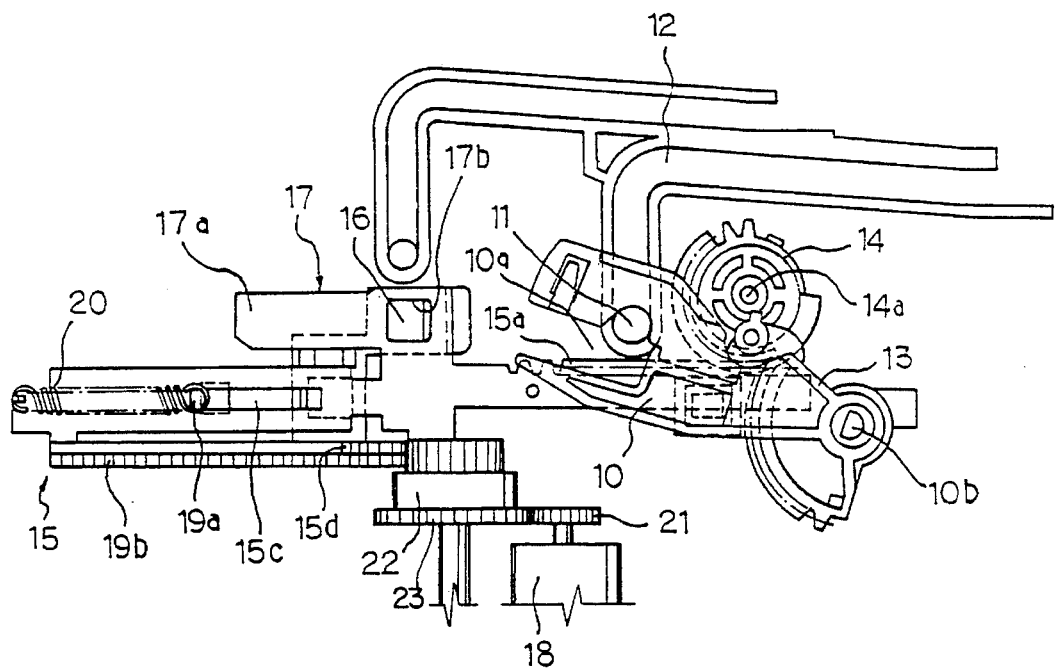
Figure 5:
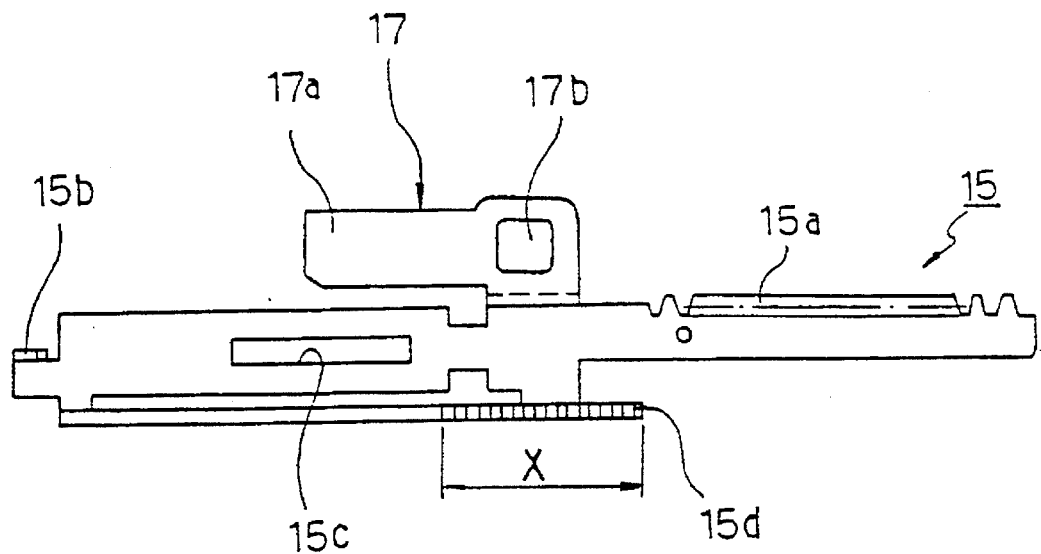

With the driving device of the preferred embodiment in an initial state, wherein gear portion 15d is not engaged with driving gear 22, as shown in FIG. 1, the cassette is inserted into the cassette holder (not shown) and the side arm 10 is thus rotated counterclockwise (i.e., a direction designated by the arrow in FIG. 1) around the shaft 10b by virtue of manual movement of the cassette holder, and thus pin 11, due to insertion of the cassette tape by the operator. Accordingly, the arm gear 13 coupled to the shaft 10b and the side arm 10 is also rotated so as to cause the connection gear 14 to rotate. This rotation of the connection gear 14 causes the horizontal movement of the first movable member 15, as shown in FIGS. 2 and 3, by virtue of engagement between connection gear 14 and the rack gear 15a.

At that time, the second movable member 19 is in a stationary state because gear portion 19b is engaged with driving gear 22 which is also stationary at this time. Also, the blocking plate 17a, formed on the sensor control member 17, eventually moves into the light path of the sensor 16. This condition is sensed by the controller which, in turn, outputs a driving signal to the loading motor 18 in response to an off state of sensor 16.

As the loading motor 18 is driven, the gear 23 and the driving gear 22 are rotated and thus the second movable member 19 is moved horizontally to the left. The projection 19a of the second movable member 19 is also moved to the left in the elongated hole 15c of the first movable member 15 and serves as a stopper when it reaches an end of the hole 15c (see FIG. 3).

Accordingly, the first movable member 15 is somewhat moved to the left side, along with the second movable member 19, so that the gear portion 15d formed on the first movable member 15 becomes engaged with the driving gear 22. At this time, the first and second movable members 15 and 19 are simultaneously moved to the left, by rotation of the driving gear 22, so as to transport the cassette holder holding the cassette tape into the housing by virtue of the rack portion 15d, the connection gear 14, the arm gear 13 and the side arm 10, which are engaged in the manner described above.

Next, the pin 11 of the cassette holder is guided downwardly moved from the curved point of the guide 12 to load the cassette tape on the deck (not shown). In particular, rotation of gear 22 moves first movable member 15 to the left and thus side arm 10 rotates further in the counterclockwise direction so as to push pin 11 along guide channel 12. Then the loading motor 18 is disengaged from the first and second movable members 15 and 19 by a clutch device (not shown). Simultaneously, the driving gear 22, rotated by the loading motor 18 is engaged with a master cam (not shown) to allow a tape recorder to operate in a desired mode (see FIG. 4). Of course, a separate motor could also be utilized to drive other portions of the recording/reproduction device.

When the perforated hole 17b formed in the sensor control member 17 is in correspondence with the light path of the sensor 16, and a substantially transparent end portion of the tape, which follows a signal recording portion of the tape is in opposition to sensor 16, the controller senses an on state of sensor 16 and the loading motor is stopped by the controller, in response thereto, so as to terminate the above-mentioned desired mode.

In order to accomplish ejection of the tape, an inverse rotating control signal is supplied from the controller, in response to an operator instruction or the end of a play mode, to the loading motor 18 and the gear portions 15d and 19b, of the first and second movable members 15 and 19 respectively, are simultaneously engaged with the driving gear 22, by the clutch device, and thus moved horizontally to the right. At this time, the gear portion 15d of the first movable member 15 is eventually moved away from the driving gear 22. As a result, the first movable member 15 is stopped while the second movable member 19 continues to move. In this case, a tension develops in the spring 20 connected to the first and second movable members 15 and 19 and thus movable member 15 continues to be moved due to the force of spring 20 and the side arm 10 is thus rotated in a clockwise direction to eject the cassette holder having the cassette inserted therein by virtue of engagement with pin 11 of the cassette holder. When the pin 11 of the cassette holder is departed from the curved point of the guide rail 12, the cassette can be smoothly and completely ejected by the first movable member 15 by virtue of the tension of the spring 20.

As described above, according to a driving device for a recording/reproduction device of the invention, since multiple movable members having rack gears, are disposed in the housing and the loading motor is controlled by the sensor control member, the cassette holder can be smoothly mounted or ejected at a relatively high speed even if the tape cassette is deeply inserted in the holder by the operator. As a result, the device can be simple in construction as compared to conventional devices.

The preferred embodiment utilizes photoelectric sensor 16. However, any appropriate sensor, such as a limit switch for example, can be utilized. Of course, sensor control member 17 must be configured to correspond with the type of sensor utilized. Also, the present invention can be utilized with any type of recording/reproduction device which utilizes a cassette tape, or other recording medium contained in a cassette format, such as a VCR for example.

While the invention has been described through a preferred embodiment, various modifications can be made thereto without departing from the scope of the invention, as defined by the appended claims.

What is claimed is:

1. A driving device for loading or ejecting a cassette tape inserted in a cassette holder in or from a deck of a recording/reproduction device, said driving device comprising:

a housing;

a side arm having an arm gear means, said side arm pivotally mounted in said housing about a shaft and coupled to said cassette holder for engagingly moving said cassette holder from an eject position to a load position and vice versa;

a connection gear engaged with said arm gear means of said side arm so as to rotate when said side arm is pivoted;

horizontally movable means engaged with said connection gear, said horizontally movable means being disposed in said housing;

a sensor disposed in said housing;

means for changing a state of said sensor in response to movement of said horizontally movable means; and a loading motor coupled to said sensor and said horizontally movable means so as to control operation of said cassette holder in response to said state of said sensor a driving gear coupled to said loading motor, wherein said horizontally movable means comprises:

a first movable member having a rack gear formed on a top surface thereof, a first gear portion having teeth formed over a predetermined region on a lower portion of said first movable member for engagement with said driving gear, and a sensor control member integrally formed on said first movable member so as to constitute said changing means, said rack gear being engaged with said connection gear; and a second movable member slidably supported on said first movable member and having a second gear portion formed thereon over substantially the entire length of said second movable member along a lower edge thereof, engaged with said driving gear, wherein said first and second gear portions are simultaneously engaged with said driving gear after said first movable member is moved by said connection gear.

2. The driving device according to claim 1, wherein said sensor is a photoelectric device and said sensor control member has a perforated hole formed at a side thereof for selectively opening a light transfer path of said sensor based on a position of said first movable member.

* * * * *